Patented Dec. 15, 1925.

1,565,796

UNITED STATES PATENT OFFICE.

ARNOLD CORTI, OF WINTERTHUR, SWITZERLAND, ASSIGNOR TO CHEMICAL WORKS FLORA, OF DUBENDORF, NEAR ZURICH, SWITZERLAND.

METHOD OF MANUFACTURING A PERFUME SMELLING LIKE AMBER.

No Drawing.  Application filed January 26, 1923. Serial No. 615,144.

*To all whom it may concern:*

Be it known that I, ARNOLD CORTI, citizen of the Republic of Switzerland, residing at Winterthur, Switzerland, have invented certain new and useful Improvements in Methods of Manufacturing a Perfume Smelling like Amber; and I do hereby declare the following to be a full, clear, and exact description of the invention, such as will enable others skilled in the art to which it appertains to make and use the same.

It is well known that one of the principal aims of perfumers is the manufacture of an artificial substitute for natural musk and natural amber. Though certain kinds of artificial musk have already been used as substitutes for natural musk and amber, no product of this kind has as yet given the desired result.

It has now been discovered that a new substance results from nitrating dibrombutyl-metacresol-methylether; this substance reproduces the natural perfume of amber better than any other discovered hitherto, and, moreover, possesses a high capacity for fixing other perfumes.

*Example.*—Dissolve 12.9 parts of dibrombutyl-metacresol-methylether in 40 parts of tetrachloride of carbon, and nitrate this solution in an acid mixture consisting of 15 parts of nitric acid of 1.51 sp. gr. and of 15 parts of sulphuric acid at 5–10°. The resulting product is isolated in the usual way and purified by recrystallization in alcohol. This new substance melts at about 100° and mainly consists of nitro-dibrom-butyl-metacresol-methylether. It may be employed for fixing purposes in perfumery.

I claim:

A new perfume and perfume base, comprising nitro-di-brom-butyl-metacresol-methyl-ether having a smell of musk and a true smell of amber, melting at 100° C.

In testimony that I claim the foregoing as my invention, I have signed my name.

ARNOLD CORTI.